Aug. 23, 1960 W. F. NEWBOLD 2,949,775
SIGNAL TRANSDUCER
Filed Jan. 25, 1956
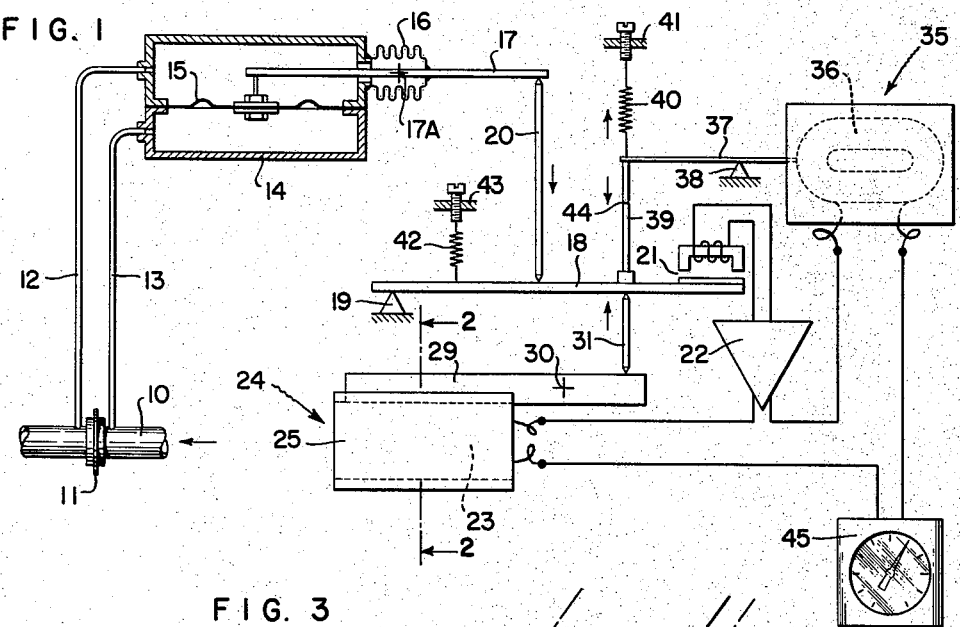
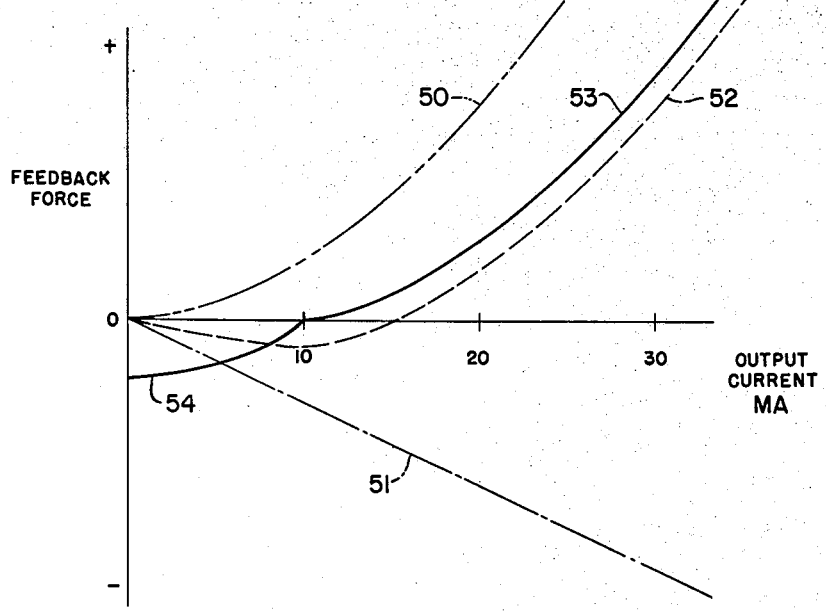
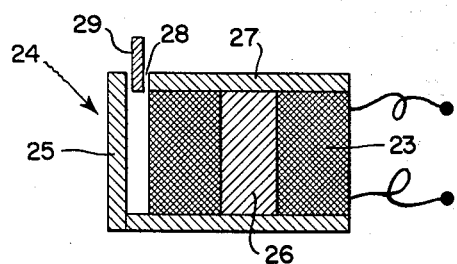
INVENTOR.
WILLIAM F. NEWBOLD
BY Arthur H. Swanson
ATTORNEY.

United States Patent Office 2,949,775
Patented Aug. 23, 1960

2,949,775

SIGNAL TRANSDUCER

William F. Newbold, Ambler, Pa., assignor to Minneapolis-Honeywell Regulator Company, Minneapolis, Minn., a corporation of Delaware Filed Jan. 25, 1956, Ser. No. 561,315

14 Claims. (Cl. 73—205)

A general object of the present invention is to provide a new and improved transducer for converting an input force into an output signal which varies as a square root function of the input force. More specifically, the present invention is concerned with a transducer of the square root extracting type having a suppressed zero and an output characteristic which is distinct in defining the transducer zero which represents a zero input force.

A well known type of flowmeter comprises a differential pressure measuring means which produces an output force which varies as the square of the flow rate of a fluid passing through an orifice associated therewith. The direct use of this squared force in the differential pressure measuring means is frequently undesirable as the resultant nonlinearity makes the output signal incompatible for use with linear types of indicating or signal utilization equipment. It has been proposed to place a transducer between the differential pressure sensing means and the output utilization apparatus to convert the squared input force into a linear output function. Heretofore, devices of this type have been difficult to calibrate, particularly in the zero flow region where the output characteristic is close to the zero line over a significant portion of the range of operation. This difficulty of calibration is particularly noticeable where the zero of the output has been suppressed to a value other than the absolute zero of the input force and the output characteristic tends to reverse its direction.

The present invention is directed to an apparatus which may readily be calibrated at the zero flow value whether the output signal is suppressed or not. This is accomplished in the present invention by providing a special combination of force producing elements within a force to current transducer, one of said force producing elements comprising a device which produces an output force which is a squared function of the signal applied thereto and the other of which produces a force signal which varies linearly with the applied signal. These force producing elements are so interconnected in combination with a suppression means to be effective to provide a preselected range of operation with a clearly defined zero point in the range.

It is accordingly a more specific object of the present invention to provide a new and improved square root extracting transducer which is characterized by a sharp zero point of calibration.

Another more specific object of the present invention is to provide an improved square root extracting transducer incorporating a linear force producing element in combination with a square function force producing element to balance a squared input force which is adapted for suppressing the output characteristic of the transducer to a desired range.

Still another more specific object of the present invention is to provide an improved transducer incorporating a square force function transducer and a linear force function transducer in combination with a suppressing means which is effective to eliminate the force produced by the linear function element when a desired zero point has been reached.

A further object of the present invention is to provide a differential pressure flowmeter utilizing the transducer elements set forth in the foregoing objects.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there is illustrated and described a preferred embodiment of the invention.

Of the drawings:

Fig. 1 is a diagrammatic showing of a preferred form of the present invention;

Fig. 2 is a cross sectional view of a transducer element used in Fig. 1 for producing a force which varies as the square of the applied input; and Fig. 3 shows a representative set of operating curves for the elements used in Fig. 1.

Referring first to Fig. 1, there is shown in this figure a flow measuring apparatus for measuring the flow of a fluid flowing through a conduit 10. An orifice 11 is placed in the conduit 10 so that there will be a differential pressure drop across the orifice proportional to the rate at which the fluid is flowing through the conduit 10. The differential pressure produced across the orifice 11 is applied by way of a pair of pressure transmitting conduits 12 and 13 to a differential pressure chamber 14. The chamber 14 is divided into two sections by a diaphragm 15, the center of the latter being adapted for displacement in accordance with the differential pressure forces applied thereto by way of the conduits 12 and 13. The motion of the diaphragm 15 is transmitted through a seal 16 by way of an output beam 17, the latter of which is pivoted by a cross spring pivot such as the pivot 17A.

The force on the beam 17 is coupled to a second beam 18, the latter of which is pivoted at 19. The coupling means between the beam 17 and the beam 18 is a coupling link 20, the latter being of sufficient strength to not bend under the thrust forces on the ends thereof. The beam 18 is adapted to be moved about the pivot 19 and the motion of the beam is detected by an electrical motion detector 21 which operates in conjunction with a suitable oscillator-amplifier transducer 22. The output of the oscillator-amplifier 22 will be a direct current signal which is proportional to the motion of the beam 18 and it is adapted to be applied to a coil 23 of a force transducer 24.

The force transducer 24 is shown in cross sectional detail in Fig. 2 and will be seen to comprise a magnetic core structure of angle shape at 25 with a core bobbin structure 26 for the coil 23. An end cap 27, likewise of suitable core material is mounted on the upper end of the core member 26. The upright portion of the core 25 is separated from the edge of cap 27 and forms therewith an air gap at 28. Positioned within the air gap 28 is a vane 29. The vane 29 may well be formed of the same material as the core materials used for the elements 25, 26, and 27. The vane 29 is pivoted by a suitable cross spring pivot 30. The vane 29 is adapted to apply a feedback force to the beam 18 by way of a suitable coupling element 31.

Another force producing element in the combination is a linear force transducer 35, the latter of which includes a coil 36 of elongated pancake construction cooperating with a magnetic field produced by permanent magnets, not shown. The coil 36 is connected to apply a force to an output beam 37 pivoted at 38. The beam 37 is coupled to the beam 18 by way of a coupling link 39.

A suppression spring 40 is coupled between the beam 37 and a grounded portion 41 of the overall apparatus. In addition, the apparatus includes a zeroing spring 42, the latter of which is adjustable and is connected between the beam 18 and a grounded structure point 43 of the apparatus.

Connected to the output of the apparatus is a suitable indicator, and/or recorder, 45. This indicator 45 may well be calibrated with linear calibrations and the indicating pointer thereof will move linearly with changes in flow in the conduit 10.

In considering the operation of the present invention it should first be noted that when there is a fluid flowing through the conduit 10, there will be a differential pressure produced across the orifice 11. This differential pressure will be applied to the opposite sides of the diaphragm 15 and the diaphragm 15 will be deflected in an upward direction in accordance with the difference between the pressures above and below the diaphragm. The deflection of the diaphragm 15 will be passed by way of the beam 17 through the seal 16 to apply a force to the beam 18 tending to move the beam in a downward direction. Any deflection of the beam 18 in a downward direction will be detected by the electrical motion detector 21 and the output of the oscillator-amplifier 22 will vary proportionally with the motion of the beam 18. As the beam moves downwardly, the output of the oscillator-amplifier 22 will increase and the increased direct current signal will be applied to the coil 23, the latter of which will act on the vane 29 so that the vane 29 will pivot in a counterclockwise direction about the pivot 30 to exert a force upon the beam 18 through the link 31 to balance the input force from the beam 17.

The apparatus described thus far is suitable for balancing the input force and producing an output current which varies linearly with the flow of the fluid in the pipe 10. Referring to Fig. 3, the feedback force from the coil 23 is represented by the line 50. This line is representative of a typical squared function curve or parabola and is shown to pass through the zero feedback force point at zero output current.

As it is frequently desirable to provide an operating range over a positive current value range, such as a range of ten milliamperes to 50 milliamperes for full instrument output, it is necessary to suppress the operation of the apparatus thus far described. This suppression is achieved by two separate means, the linear force transducer 35 and the zero adjusting spring 42. The linear force transducer 35 has its operating coil 36 connected in series with the output of the oscillator-amplifier 22 so that the output current flowing through the coil 36 will produce a force on the beam 37 directly proportional to the magnitude of the current flowing through the coil 36. This force is represented in Fig. 3 by the line 51. This line 51 shows that with zero output current, the output force of the transducer 35 will be zero and the force will increase linearly with linear increases in the output current. The force from the linear force transducer 35 is applied to the beam 18 in opposition to the feedback force from the squared function transducer 24 so that, referring to Fig. 3, there will be a resultant curve 52 showing the combined or net force acting upon the beam 18. To this net force there is added the constant force of the zero adjusting spring 42. It will be noticed that this spring acts, in tension, in the same direction as the non-linear feedback member 24 and in a direction opposed to that of the linear unit 35. This has the effect of displacing the aforementioned curves such that the curve 50 would intersect the zero force axis at ten milliamperes and the curve 52 would lie superimposed upon the curve 53 up to the point of tangency with the zero force axis at ten milliamperes. It will be noted that the curve 52 follows the general form of the curve 50 as modified by the linear opposing force 51. This curve is still of paraboloid form but with the scale factor changed by the linear force unit output. It will also be noted that the curve 52 reaches a minimum or low point at approximately ten milliamperes and then begins to reverse its direction back to a zero force value at zero current. This type of suppression, as produced by the linear force coil 35, is not adequate in that the zero point at ten milliamperes, or the low point, is not clearly defined and the characteristic output force of the combined coils tends to reverse in direction. This would mean that there would be a very unreliable indication of flow at the zero point which would render the apparatus very unreliable in the low flow measuring regions.

In order to overcome this unreliability as indicated by the curve 52, and to provide a sharp zero point, the spring 40 has been added to the combination. The spring 40 is coupled directly to the output beam 37 of the linear force transducer 35 and is arranged so that at the selected zero point, the force from the spring 40 will be equal to and opposite the force produced on the beam 37 by the coil 36 so that the effect of the linear force transducer will be eliminated from the combination at the selected zero point. The added force of this spring 40 acting against the force of the linear unit 35 effectively shifts the curve 51 along the zero force axis to make an intercept at ten milliamperes. At current below ten milliamperes, the force of the spring is greater than the force of the magnet, thereby decoupling the magnet from the beam 18 at the junction 44. The resultant curve for this is shown by curve 53 in Fig. 3 and the zero point is established at ten milliamperes by the action of this spring 40 and the spring 42. With the sharp zero point at ten milliamperes, and the force of the linear force transducer 35 eliminated, the output characteristic below the ten milliampere region will follow the curve 54 which corresponds to the lower portion of the curve 50 as shifted by the effect of the spring 42 and will not produce any instability in the system should the system be used for control purposes.

The spring 40 and the beam 37 are directly coupled together and they may also be directly coupled to the leg 39 between the beam 18 and the beam 37. However, it is generally desirable that once the desired zero point has been reached, that the linear force transducer 35 be completely removed from the system. This may be accomplished by effectively opening the link at point 44, said point normally being a pressure bearing point when the coil 36 is producing a force larger than the counter force of the suppression spring 40.

While the apparatus is shown with the input force produced directly by a differential pressure transducer apparatus, the invention is obviously applicable to an arrangement where a current force proportional to the square of the flow in the conduit 10 is produced on the beam 18 by a suitable input transducer. Further, while the apparatus has been shown as an electro-mechanical apparatus, the principles herein are applicable to other types of control medium as pneumatic and hydraulic.

While, in accordance with the provisions of the statutes, there has been illustrated and described the preferred embodiments of the invention, those skilled in the art will understand that changes may be made in the forms of the apparatus disclosed without departing from the spirit of the invention as set forth in the appended claims, and that some features of the present invention may be used to advantage without a corresponding use of other features.

Having now described the invention, what is claimed as new and for which it is desired to secure by Letters Patent is:

1. Apparatus for transducing an input force signal into an output signal which is a square root function of the input force signal comprising an input member adapted to have the input force applied thereto, a motion detecting means positioned with respect to said member to produce an output signal indicative of the motion of said member, a feedback force producing means connected to said detecting means and adapted to apply a feedback force to said input member which is a squared function of the output of said motion detecting means, and further means connected to said input member including an element energized by said motion detecting means, said further means also including means for producing a sharp change in feedback force at a preselected value of output signal from said detecting means.

2. Apparatus for transducing an input force signal into an output electrical signal which is a square root function of the input force signal comprising an input member adapted to have the input force applied thereto, a motion detecting means positioned with respect to said member to produce an output electrical signal indicative of the motion of said member, a feedback force producing means connected to said detecting means and adapted to apply a feedback force to said input member which is a squared function of the output electrical signal of said motion detecting means, and electro-mechanical means connected to said input member including an element energized by said motion detecting means, said electro-mechanical means also including means for producing a sharp change in output signal at a preselected value of output signal from said detecting means.

3. Apparatus for transducing an input force signal into an output electrical signal which is a square root function of the input force signal comprising an input member adapted to have the input force applied thereto, a motion detecting means positioned with respect to said member to produce an output electrical signal indicative of the motion of said member, an electro-mechanical feedback force producing means connected to said detecting means and adapted to apply a feedback force to said input member which is a squared function of the output of said motion detecting means, and a second electro-mechanical means connected to said input member and being energized by said motion detecting means, said electro-mechanical means producing a force on said input member which is in opposition to the feedback force and which is a linear function of the output signal of said motion detecting means.

4. A force to current transducer comprising an input member adapted to have an input force applied thereto, a motion detecting means positioned adjacent and operatively associated with said member to have an output current proportional to the motion of said input member, an electro-magnetic force producing means connected to said member and being energized by said motion detecting means, said force producing means producing a feedback force on said input member which is proportional to the square of the output current of said motion detecting means, a second electromagnetic means connected to said input member and being energized by said motion detecting means, said second electromagnetic means producing a force on said input member which is in opposition to said feedback force and which varies linearly with the output current of said motion detecting means, and a suppression spring connected to said second electro-magnetic means to cancel the force of said second electro-magnetic means on said input member at a preselected value of output current from said motion detecting means.

5. A force to current transducer comprising an input member adapted to have an input force applied thereto, a motion detecting means positioned adjacent and operatively associated with said member to have an output current proportional to the motion of said input member, an electro-magnetic force producing means including a first coil and being connected to said member and being energized by said motion detecting means, said force producing means producing a feedback force on said input member which is proportional to the square of the output current of said motion detecting means, a second electro-magnetic force producing means including a second coil connected to said input member and being connected in series with said first coil by said motion detecting means, said second electro-magnetic means producing a force on said input member which is in opposition to said feedback force and which varies linearly with the output current of said motion detecting means, and a suppression spring connected to said second electro-magnetic means to cancel the force of said second electro-magnetic means on said input member at a preselected value of output from said motion detecting means.

6. A force to current transducer comprising an input member adapted to have an input force applied thereto, a motion detecting means positioned adjacent and operatively associated with said member to have an output current proportional to the motion of said input member, an electro-magnetic force producing means connected to said member and being energized by said motion detecting means, said force producing means producing a feedback force on said input member which is proportional to the square of the output current of said motion detecting means, a second electro-magnetic means connected to said input member and being energized by said motion detecting means, said second electromagnetic means producing a force on said input member which is in opposition to said feedback force and which varies linearly with the output current of said motion detecting means, a suppression spring connected to said second electro-magnetic means to cancel the force of said second electro-magnetic means on said input member at a preselected value of output from said motion detecting means, and a zeroing spring connected to produce a force on said input member to select the magnitude of the input force at which said preselected value of output will be present.

7. A differential pressure transmitter for a fluid flow signal comprising a differential pressure mechanism, a first member mounted to be deflected in accordance with the differential pressure applied to said mechanism, a second member connected to said first member to be deflected therewith, a motion detector positioned adjacent and operatively associated with said second member to produce an output signal indicative of the magnitude of said deflection, a first force producing means connected to said second member, said first force producing means having an input from the output of said motion detecting means and producing a balancing force on said second member which varies as the square of the output signal of said motion detecting means, a second force producing means connected to said second member and producing a force on said second member in opposition to said balancing force, said second force producing means being energized by said output signal to produce a force which varies linearly with said output signal, and a suppression spring connected to said second force producing means to cancel the force thereof on said second member when the output of said motion detecting means attains a predetermined value.

8. A differential pressure transmitter for a fluid flow signal comprising a differential pressure mechanism, a first member mounted to be deflected in accordance with the differential pressure applied to said mechanism, a second member connected to said first member to be deflected therewith, a motion detector positioned adjacent and operatively associated with said second member to produce an output signal indicative of the magnitude of said deflection, a first force producing means connected to said second member, said first force producing means having an input from the output of said motion detecting means and producing a balancing force on said second member which varies as the square of the output signal of said motion detecting means, a second force producing means connected to said second member and producing a force on said second member in opposition to said balancing force, said second force producing means being energized by said output signal to produce a force which varies linearly with said output signal, a suppression spring connected to said second force producing means to cancel the force thereof on said second member when the output of said motion detecting means attains a predetermined value, and a zeroing spring connected to said second member to preselect said predetermined value.

9. A differential pressure transmitter for a fluid flow signal comprising a differential pressure mechanism, a first member mounted to be deflected in accordance with the differential pressure applied to said mechanism, a second member connected to said first member to be deflected therewith, a motion detector positioned adjacent and operatively associated with said second member to produce an output signal indicative of the magnitude of said deflection, a first force producing means connected to said second member, said first force producing means having an input from the output of said motion detecting means and producing a balancing force on said second member which varies as the square of the output signal of said motion detecting means, a second force producing means connected to said second member and producing a force on said second member in opposition to said balancing force, said second force producing means being energized by said output signal to produce a force which varies linearly with said output signal, and a suppression spring connected to said second force producing means to cancel the force thereof on said second member when the output of said motion detecting means attains a predetermined value, a zeroing spring connected to said second member to exert a force thereon to preselect said predetermined value, and a flow indicating means connected to the output of said motion detecting means, said flow indicating means having a linear flow calibration.

10. A differential pressure flow transmitter comprising a member having an input force applied thereto proportional to the rate of flow of a fluid, said force varying as the square of the fluid flow rate, a motion detector positioned adjacent and operatively associated with said member to produce an output current proportional to the deflection of said member, a feedback force transducer comprising an electro-magnetic means including a coil which when energized produces an output force proportional to the square of the applied current signal, means connecting said transducer to said member to produce a balancing force thereon in opposition to the input force, a second force transducer comprising an electromagnetic means including a second coil which when energized produces an output force aiding said input force and which is linearly proportional to the applied current signal, means connecting said first named coil and said second coil in series with the output of said motion detecting means, and a suppression spring connected to said member to cancel the force from said second force transducer when the output current of said motion detecting means decreases to a preselected value.

11. Apparatus for transducing an input force signal into an output signal which varies as a first function over a first range of output signal and then varies as a second function over a second range of output signal comprising an input member adapted to have the input force applied thereto, a motion detecting means positioned with respect to said member to produce an output signal indicative of the motion of said member, a feedback force producing means connected to said detecting means and adapted to apply a feedback force to said input member, a second force producing means connected to said detecting means and adapted to apply a force to said input member, and force responsive limiting means coupled to said second force producing means to limit the application of force by said second force producing means to a predetermined value.

12. Apparatus for transducing an input force signal into an output signal which varies as a first function over a first range of output signal and varies as a second function over a second range of output signal comprising an input member adapted to have the input force applied thereto, a motion detecting means positioned with respect to said member to produce an output signal indicative of the motion of said member, a feedback force producing means connected to said detecting means and adapted to apply a feedback force to said input member, a second force producing means connected to said detecting means and adapted to apply a force to said input member, and means effective when the output of said detecting means reaches a predetermined value for rendering said second force producing means ineffective to produce a force on said input member, said means comprising a spring connected to said second force producing means so that the force thereof is in opposition to the output force of said second force producing means.

13. Apparatus for changing the output characteristic of a force balanced transducer comprising a first and second force producing means connected in opposition to each other and jointly energized by the output of said apparatus, and force responsive limiting means coupled to said second force producing means to limit the application of force by said second force producing means to a predetermined value.

14. Apparatus for changing the output characteristic of a force balanced transducer comprising a first and second force producing means connected in opposition to each other on a common element and being jointly energized by the output of said apparatus, and force responsive limiting means coupled to said second force producing means to limit the application of force by said second force producing means to a predetermined value.

References Cited in the file of this patent

UNITED STATES PATENTS

| | | |
|---|---|---|
| 1,586,834 | Ormsby | June 1, 1926 |
| 2,408,685 | Rosenberger | Oct. 1, 1946 |
| 2,436,451 | Rosenberger | Feb. 24, 1948 |
| 2,631,027 | Payne | Mar. 10, 1953 |
| 2,669,874 | Ziegler | Feb. 23, 1954 |
| 2,686,893 | Markson | Aug. 17, 1954 |
| 2,780,101 | Kinkel | Feb. 5, 1957 |